(12) United States Patent
Kay (10) Patent No.: US 10,107,615 B2
(45) Date of Patent: Oct. 23, 2018

(54) REMOTE PROBE FOR OPTICAL MEASURING MACHINE

(71) Applicant: Quality Vision International, Inc., Rochester, NY (US)

(72) Inventor: David B. Kay, Rochester, NY (US)

(73) Assignee: Quality Vision International, Inc., Rochester, NY (US)

( * ) Notice: Subject to any disclaimer, the term of this patent is extended or adjusted under 35 U.S.C. 154(b) by 32 days.

(21) Appl. No.: 15/133,837

(22) Filed: Apr. 20, 2016

(65) Prior Publication Data

US 2017/0307352 A1 Oct. 26, 2017

(51) Int. Cl.
*G01B 9/02* (2006.01)
*G01B 11/00* (2006.01)

(52) U.S. Cl.
CPC ..... *G01B 9/02057* (2013.01); *G01B 9/02067* (2013.01); *G01B 11/005* (2013.01); *G01B 11/007* (2013.01)

(58) Field of Classification Search
CPC .............. G01B 9/02057; G01B 9/0205; G01B 9/02063; G01B 9/02067; G01B 9/02044; G01B 9/0209; G01B 11/005; G01B 11/2441; G01D 5/268; G01M 11/025; G01M 11/0271
USPC .......................................................... 356/511
See application file for complete search history.

(56) References Cited

U.S. PATENT DOCUMENTS

| 5,133,601 A | 7/1992 | Cohen et al. |
| 5,349,440 A | 9/1994 | DeGroot |
| 5,706,085 A | 1/1998 | Blossey et al. |
| 5,943,133 A | 8/1999 | Zeylikovich et al. |
| 6,490,046 B1 | 12/2002 | Drabarek et al. |
| 6,721,094 B1 * | 4/2004 | Sinclair ............ G01B 9/04 356/445 |
| 6,985,232 B2 | 1/2006 | Sezginer |
| 7,034,271 B1 | 4/2006 | Sinclair et al. |
| 7,271,918 B2 | 9/2007 | DeGroot et al. |

(Continued)

OTHER PUBLICATIONS

Jan Niehues, Peter Lehmann and Weichang Xie, Low coherent Linnik interferometer Optimized for use in Nano Measuring Machines, 56th International Scientific Colloquium, Ilmenau University of Technology, Sep. 12-16, 2011.

(Continued)

*Primary Examiner* — Tarifur Chowdhury
*Assistant Examiner* — Jonathon Cook
(74) *Attorney, Agent, or Firm* — Thomas B. Ryan; Harter Secrest & Emery LLP (57) ABSTRACT

A probe for an optical measurement system includes a probe body arranged to be adjustably mounted in a measuring machine for optically measuring a test object. A single mode fiber optically coupled within the probe body transmits a source beam having an instantaneous or sequentially established bandwidth spanning a range of wavelengths to the probe body and also transmits a measurement beam from the probe body toward a detector. An adjustable beam manipulator within the probe body spatially excludes portions of the reference beam over a progression of different size portions from being focused within the acceptance cone of the single mode fiber to more closely balance the intensities of the reflected object beam and the reflected reference beam within the measurement beam.

22 Claims, 8 Drawing Sheets

(56) References Cited

U.S. PATENT DOCUMENTS

| | | | |
|---|---|---|---|
| 7,339,679 | B2 | 3/2008 | Drabarek et al. |
| 7,365,859 | B2 | 4/2008 | Yun et al. |
| 7,400,408 | B2 | 7/2008 | Drabarek et al. |
| 7,446,882 | B2 | 11/2008 | De Lega et al. |
| 7,636,168 | B2 | 12/2009 | De Lega et al. |
| 7,791,731 | B2 | 9/2010 | Kay |
| 7,995,210 | B2 | 8/2011 | Tearney et al. |
| 8,345,257 | B2 | 1/2013 | Bonnema et al. |
| 8,442,284 | B2 | 5/2013 | Rogers et al. |
| 9,091,523 | B2 | 7/2015 | Kay |
| 2006/0215170 | A1 | 9/2006 | Toida et al. |
| 2009/0040521 | A1 | 2/2009 | Hu et al. |
| 2009/0153839 | A1 | 6/2009 | Kay |
| 2011/0149245 | A1* | 6/2011 | Barth .................. A61B 3/1005 351/215 |
| 2012/0138586 | A1 | 6/2012 | Webster |
| 2014/0293286 | A1 | 10/2014 | Kapit et al. |
| 2014/0362383 | A1* | 12/2014 | Haitjema .................. G01J 1/02 356/450 |

OTHER PUBLICATIONS

New Linnik interferometer objective—Sensofar, New Linnik Interferometer Objective, Metrology, Products| May 14, 2010.

S. K. Debnath, N. Krishna Mohan, D. K. Sharma, M. P. Kothiyal, Optical profiling using white light interference in spectral domain, Applied Optics Laboratory, Department of Physics Indian Institute of Technology Madras, Chennai-600 036, India.

Arnaud Dubois, "Full-Field Optical Coherence Microscopy, Selected Topics in Optical Coherence Tomography," InTech, Published online Feb. 8, 2012.

I. Malinovsky, R. S. Franca, I. B. Couceiro, M. S. Lima, C. L. S. Azeredo, C. M. S. Almeida, J. P. Weid, "Primary Imaging Interference Microscope for Nanometrology," XX IMEKO World Congress Metrology for Green Growth, Sep. 9-14, 2012, Busan, Republic of Korea.

W. Y. Oh, B.E. Bouma, N. Iftimia, R. Yelin, and G.J. Tearney, "Spectrally-modulated full-field optical coherence microscopy for ultrahigh-resolution endoscopic imaging," NIH Public Access Author Manuscript, Opt Express. (Sep. 18, 2006); 14(19): 8675-8684.

Gerd Hausler and Michael Walter Lindner, "'Coherence Radar' and 'Spectral Radar'—New Tools for Dermatological Diagnosis," J. Biomed. Opt. 3(1), 21-31 (Jan. 1, 1998).

Chan et al., "Techical Note A Simple Thermal Phase Stabilizer for Real-Time Optical Fibre Holographic Interferometry", Optics and Laser Technology, vol. 24, No. 6, Dec. 31, 1992.

Kaura et al., "In-Situ Non-Destructive Testing Studies Using Fiber Optical Holographic Techniques", Laser Applications in Material Science and Industry, Dec. 31, 1997, pp. 59-62.

International Search Report and Written Opinion from counterpart International Patent Application No. PCT/US2017/026193.

* cited by examiner

REMOTE PROBE FOR OPTICAL MEASURING MACHINE

TECHNICAL FIELD

In the field of optical metrology, an optical probe of a coordinate measuring machine typically is moved over a test object to acquire point-by-point interferometric measurements of a test object. Optics are often divided between the probe and another part of the machine.

BACKGROUND

Point-by-point measurements of relative optical path length displacements can be made over a wide range of such optical displacements by measuring rates of interferometric phase variation with wavenumber. For example, a spatially coherence source beam composed of multiple wavelengths, i.e., a low temporally coherent beam, can be divided by a beamsplitter into an object beam that is reflected from the test object and a reference beam that is reflected from a reference reflector. Reflected light from both the test object and the reference reflector is recombined at a beamsplitter into a measurement beam and refocused within a detector such as a spectrometer, which records interference intensities of the different spectral components of the returning measurement beam. Based on the linear relationship between (a) the rate of change in interference phase with the change in beam frequency, referred to a modulation frequency, and (b) the optical path length difference between the object and reference beams, the relative optical displacements between different measured points can be ascertained.

Since information is collected on a point-by-point basis, single mode fibers can be used to convey light along portions of the object and reference arms as well as light traveling to and from the light source and the detector. However, bending motions as well as temperature fluctuations can produce optical path length variations in the fibers and dispersion that reduce measurement accuracy. Fiber optic cables to articulated optical probes are particularly susceptible to such disturbances when they use separate transmit and receive fibers.

In addition, object beam intensities are subject to change depending on the reflectivity characteristics of the measured test objects including different portions of the same test object. Imbalanced intensity variations between object and reference beams reaching the detector tend to reduce interference phase contrast, which can also reduce the accuracy with which the interferometric based measurements can be made.

SUMMARY OF INVENTION

Certain embodiments provide for enhancing interference phase contrast in an optical measurement system having an interferometer probe connected to both a light source and a detector by single mode fiber transmissions. According to one approach, a collimated source beam having an instantaneous or sequentially established bandwidth spanning a range of wavelengths is directed to a beamsplitter within the interferometer probe at which the source beam is divided into (a) an object beam that is directed along an object arm through an object objective within the interferometer probe to an object focus on a test object and (b) a reference beam that is directed along a reference arm to a reference reflector within the interferometer probe. Both the object beam reflected from the test object and the reference beam reflected from the reference reflector are recombined at the beamsplitter into a measurement beam. The measurement beam is focused into a single mode fiber within an acceptance cone of the single mode fiber and is transmitted along the single mode fiber toward the detector. In a position along the reference arm, a progression of different size portions of the reference beam can be adjustably excluded from being focused within the acceptance cone of the single mode fiber to more closely balance the intensities of the reflected object beam and the reflected reference beam within the measurement beam transmitted toward the detector. The adjustment can be set to accommodate expected reflectivities from test objects or to accommodate variations in the reflectivities from test objects.

For making the adjustment, respective intensities of the reflected object beam and the reflected reference beam within the measurement beam can be compared and the portion of the reference beam excluded from the angular acceptance cone of the single mode fiber can be adjusted to more closely balance the intensities of the reflected object beam and the reflected reference beam within the measurement beam. For example, the comparison can be made by measuring contrast among phase modulations of different wavelengths in the detector. The excluded portion can include contiguous or noncontiguous portions of the reference beam.

At the beamsplitter, the reference beam can be directed along the reference arm through a reference objective within the interferometer probe to a reference focus on the reference reflector. A portion of the reference beam can be variably excluded by defocusing the reference beam on the reference reflector so that the excluded portion of the reference beam is directed on a path outside the acceptance cone of the single mode fiber. The reference beam can be defocused by translating the reference reflector with respect to the reference objective along a common optical axis together with an optical path length adjustment to maintain the relative optical path length between the reference arm and the object arm.

Alternatively, a portion of the reference beam can be variably excluded by angularly redistributing portions of the reference beam so that the excluded portion of the reference beam is directed on a path outside the acceptance cone of the single mode fiber. The reference beam can be angularly redistributed by pivoting the reference reflector about an axis passing through the reference focus.

A portion of the reference beam can also be variably excluded by intercepting a portion of the reference beam that would otherwise reach the acceptance cone of the single mode fiber. The reference beam can be intercepted by an adjustable aperture stop.

Preferably, the source beam is transmitted by the same single mode fiber to the collimating lens for directing the collimated source beam to the beamsplitter within the interferometer probe. Since a preferred multi-wavelength light source due to current technology usually emits invisible light, a second light source can be used to emit visible light that can be seen on the test object. The visible light can be transmitted along the single mode fiber to the collimating lens, through the beamsplitter, and along the object arm through the object objective to a focus spot on the test object. Thus, the focus position of the object beam can be seen on the test object for purposes of setup and monitoring.

Other embodiments feature an interferometer probe for an optical measurement system. The interferometer probe has a probe body arranged to be adjustably mounted in a measuring machine for optically measuring a test object. At least one single mode fiber optically coupled within the probe body provides for transmitting a source beam having an instantaneous or sequentially established bandwidth spanning a range of wavelengths to the probe body and for transmitting a measurement beam from the probe body toward a detector. At least one collimator/coupler, a beamsplitter, an object objective, and a reference reflector are mounted within the probe body. The at least one collimator/coupler is arranged for (a) collimating the source beam emitted from the at least one single mode fiber and (b) focusing the measurement beam into the at least one single mode fiber within an acceptance cone of the at least one single mode fiber. The beamsplitter is arranged for (a) dividing the collimated source beam into both an object beam that is directed along an object arm through the object objective to an object focus proximate the test object and a reference beam that is directed along a reference arm through the reference objective to a reference focus proximate the reference reflector and (b) combining the object beam reflected from the test object with the reference beam reflected from the reference reflector into the measurement beam. An adjustable beam manipulator provides for excluding portions of the reference beam over a progression of different size portions from being focused within the acceptance cone of the at least one single mode fiber to more closely balance the intensities of the reflected object beam and the reflected reference beam within the measurement beam. This progression will occur only during initial calibration on a nominal object (target), or between two different objects, or while measuring an object.

A reference objective can also be mounted within the probe body such that the reference beam propagates along the reference arm through the reference objective to a reference focus proximate the reference reflector. For spatially excluding variable portions of the reference beam from entering the single mode fiber, the beam manipulator can be arranged for variously defocusing the reference beam on the reference reflector. For example, the beam manipulator can include a first linear adjuster for translating the reference reflector with respect to the reference objective along a common optical axis and a second linear adjuster for relatively adjusting relative optical path length between the reference arm and the object arm to compensate for the change in optical path length associated with the translation of the reference reflector.

Alternatively, the beam manipulator can be arranged for angularly redistributing portions the reference beam so that the excluded portion of the reference beam is directed on a path outside the acceptance cone of the single mode fiber. For example, the beam manipulator can include a tilt actuator or other tilt adjuster for pivoting the reference reflector about an axis passing through the reference focus.

The beam manipulator can also be arranged for intercepting portions of the reference beam that would otherwise reach the acceptance cone of the single mode fiber. For example, the beam manipulator can include an adjustable aperture stop.

Preferably, the at least one single mode fiber that is optically coupled within the probe body is a single fiber that provides for both transmitting the source beam to the probe body and transmitting the measurement beam from the probe body. The excluded portions of the reference beam can include noncontiguous portions of the reference beam. The relative intensity of the reference portion of the measuring beam can be adjusted with respect to the intensity of the object beam portion of the measuring beam, for example, during the initial calibration of the measuring machine based on expected reflectivities of the test objects, during a later recalibration of the measuring machine for the same or other purposes, between measurement of test objects, including between test objects with different expected reflectivities, or during measurement of individual test objects to maintain a desired level of interference contrast within the detector.

DETAILED DESCRIPTION

Figure 1:
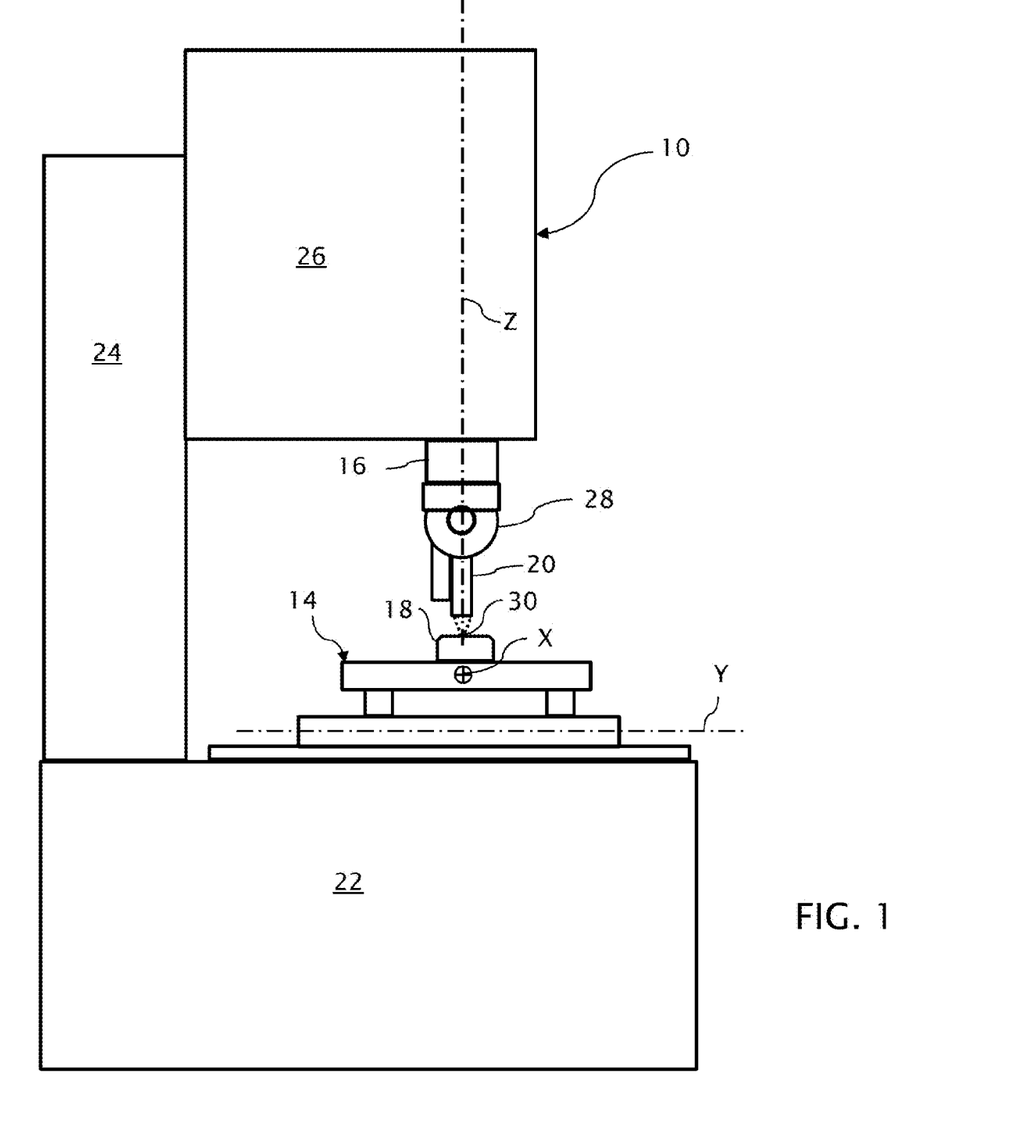
FIG. 1 is a schematic side elevational view of a multi-axis measuring machine with a vertically displaceable slide mechanism.

A multi-axis machine 10 depicted in FIG. 1 in one of many possible configurations of an optical measuring machine, includes an x-y stage 14 for horizontally translating a test object 18 along X and Y coordinate axes and a slide mechanism 16 for vertically translating an interferometer probe 20 along a Z coordinate axis. The x-y stage 14 is supported on a machine base 22. The slide mechanism 16 is supported in a slide support 26 carried on a column 24. The interferometer probe 20 is carried on an articulated arm 28 that is both pivotal about a horizontal axis and rotatable together with the pivot axis about the Z coordinate axis, although it could be fixed mounted to the Z coordinate axis. Other unseen portions of the probe optics, including one or more light sources and a detector, or other apparatus supporting the metrology functions of the machine 10 can be housed in the slide support 26 within which the slide mechanism 16 is translatable. Relative motions between the interferometer probe 20 and the test object 18 are measured along or about the various axes to monitor the relative position of the interferometer probe with respect to the test object 18 within a common coordinate system. Besides the interferometric probe 20, a multi-axis machine may also include vision systems and other probes mounted to the Z coordinate axis.

The measuring machine 10 can be arranged with other combinations of rotational and translational axes for relatively moving one or the other of the test object 18 and the interferometer probe 20. Preferably, for gathering information about the test object 18, such as empirical descriptions of test object profiles, the relative motions provide for maintaining an optical focus 30 of light emitted through optical elements of the probe 20 proximate to the test object 18 over a range of different positions on the test object 18 at orientations effective for collecting specular or diffuse reflections of the light from the test object 18 through the same optical elements of the probe 20.

Figure 2:
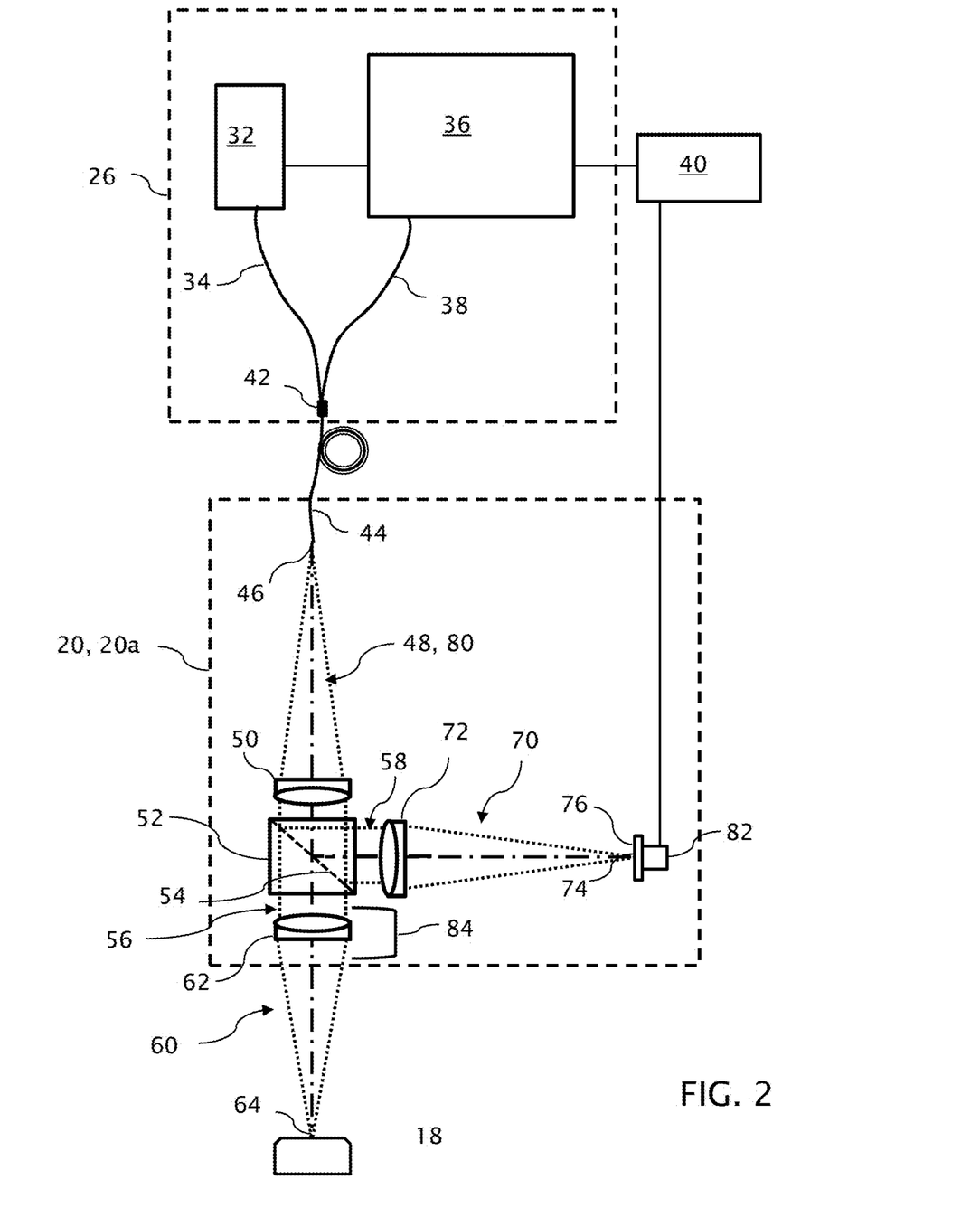
FIG. 2 is a diagram of an optical measurement system for the measuring machine of FIG. 1 in which object and reference arms of an interferometer are mounted in a probe and connected to both a light source and a detector by a single mode fiber with a reference beam manipulator associated with the reference arm for more closely balancing intensities of object and reference beams directed to the detector.

An optical arrangement for taking measurements of the test object 18 with an optical measurement system for the measuring machine 10 is shown in FIG. 2. A light source 32, such as a superluminescent diode, housed in a machine enclosure such as the slide support 26, provides for delivering high spatially coherent but low temporally coherent (i.e., light containing a range of wavelengths over a continuum of wavelengths) to the interferometer probe 20 through a single mode fiber 34. Preferably within the same enclosure, such as the slide support 26, a detector 36 is arranged for receiving the light returning from the interferometer probe 20 though a single mode fiber 38. A processor 40 for processing information from the detector 36 is preferably located outside the enclosure for communicating with a user interface (not shown).

A fiber coupler 42, which can be a 50%/50% coupler, connects the single mode fibers 34 and 38 to a common single mode fiber 44 for transmitting the high spatially coherent, low temporally coherent light to and from the interferometer probe 20. As schematically shown, the single mode fiber 44 has extra length to accommodate motions of the interferometer probe 20 with respect to the slide support 26.

Within the interferometer probe 20 having a probe body 20a schematically coincident with the representative dashed outline of the interferometer probe 20, the light is directed to a Linnik-type interferometer, although other interferometric arrangements could be used. In the arrangement shown, the light emitted from an end 46 of the single mode fiber 44 as a source beam 48 (shown in dotted lines) is gathered and collimated by a collimator/condenser lens 50 in alignment with a beamsplitter 52. At a partially reflective surface 54 of the beamsplitter 52, the source beam 48 is divided into an object beam 56 (shown in dotted lines) that transmits through the partially reflective surface 54 and a reference beam 58 (shown in dotted lines) that is reflected by the partially reflective surface 54. The object beam 56 propagates along an object arm 60 through an object objective lens 62 within the probe body 20a to an object focus 64 proximate the test object 18 beyond the probe body 20a. The reference beam 58 propagates along a reference arm 70 through a reference objective lens 72 within the probe body 20a to a reference focus 74 proximate a reference reflector 76, which can be in the form of a plane mirror also within the probe body 20a. Preferably, all three lenses 50, 62, and 72 are achromatic, low dispersion lenses for matching focusing effects of the different wavelengths within the source, object, reference, and measurement beams 48, 56, 58, and 80.

Specular or diffuse reflections of the object beam 56 from the test object 18 are collected and re-collimated by the object objective lens 62 on route back to the beamsplitter 52. Similarly, reflections from the reference reflector 76 are collected and re-collimated by the reference objective lens 72 on route back to the beamsplitter 52. At the beamsplitter 52, at least a portion of the returning object beam 56 that transmits through the partially reflective surface 54 is recombined with at least a portion of the returning reference beam 58 that reflects from the partially reflective surface 54 into a common measurement beam 80 (shown overlaid with the source beam 48) on a return path to the collimator/condenser lens 50. Since the reflectivity of the test object 18 is generally less than the reflectivity of the reference reflector 76, the beamsplitter 52 is preferably arranged to more efficiently transmit light through the partially reflective surface 54 and to less efficiently reflect light from the partially reflective surface 54. The collimator/condenser lens 50 focuses the measurement beam 80 containing portions of the object and reference beams 56 and 58 back into the single mode fiber 44 for transit to the detector 36. The end 46 of the single mode fiber 44 receives the measurement beam 80 through the volume of an acceptance cone, which is related generally to the refractive indices of the fiber core and cladding.

Within the detector 36 arranged as a spectrometer, the measurement beam 80 can be re-collimated and reflected off a diffraction grating over a range of spectrally dispersed orientations, and the dispersed orientations of the measurement beam 80 can be focused along a linear array of photodiodes or charge-coupled devices (CCDs). Each different frequency (as a reciprocal of wavelength) from the object beam 56 portion of the measurement beam 80 interferes with the corresponding frequency of the reference beam 58 portion of the measurement beam 80 at a different focus position along the array. The intensity of the light focused along the array, representative of modulo 27 phase differences between the object and reference beam 56, 58 portions of the measurement beam 80, modulates at a detectable frequency, referred to as a modulation frequency that varies within a Nyquist interval (due to pixel sampling) proportional to the optical path length difference between the object and reference beam 56, 58 portions of the measurement beam 80. Since the intensity information is collected by a discrete number of pixels, the distinguishable frequencies generally range from zero up to one-half of the number of pixels involved in the measurement.

Figure 3A:
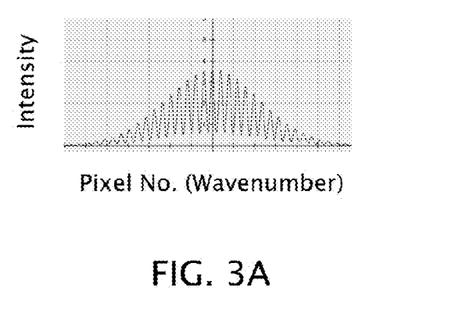
FIGS. 3A and 3B graphically depict two different measurement outputs of the interferometer in which intensity varies as a function of wavenumber at different modulation frequencies associated with different optical path lengths of the object and reference beams.
Figure 3B:
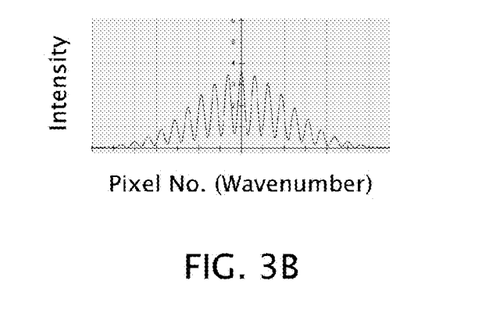
Figure 4:
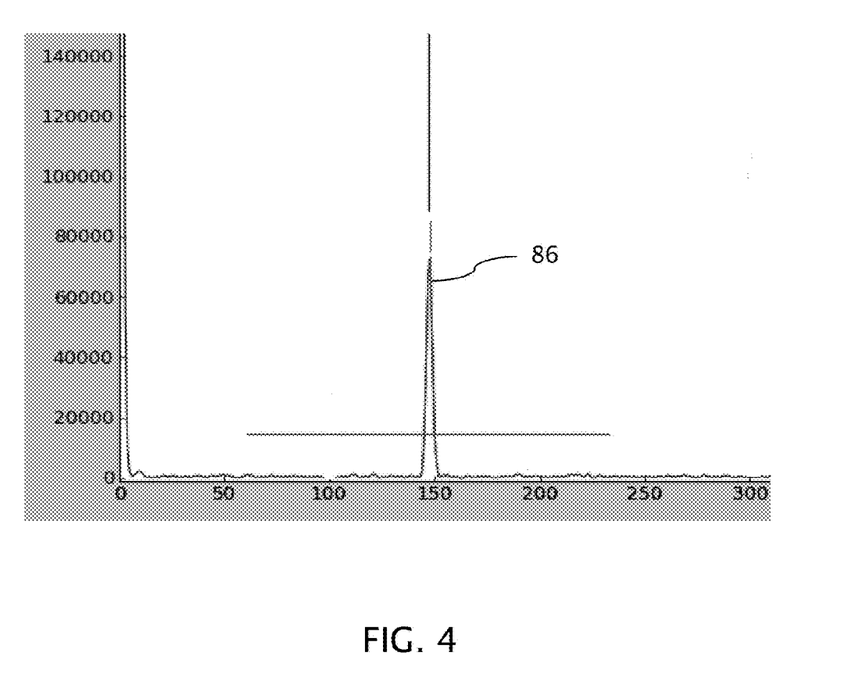
FIG. 4 graphically depicts a calculated output of a processor for identifying a modulation frequency based on the output of the detector.

FIGS. 3A and 3B graph two different examples of intensity variations captured along the linear array pixels and along which the focus positions of the different frequencies (wavenumbers) are dispersed. The variation in intensity corresponding to variations in interference phase is substantially periodic at a measurable frequency, referred to as the modulation frequency. As optical path length differences between the object and reference beam 56, 58 portions of the measurement beam 80 increase from zero (i.e., the null position), the modulation frequency increases proportionally within the Nyquist interval of measurement. For example, the frequency of modulation depicted in FIG. 3A appears higher than the frequency of modulation depicted in FIG. 3B, evidencing a greater optical path length difference between the object and reference beam 56, 58 portions of the measurement beam 80 in the measurement captured by the detector 36 as shown in FIG. 3A versus the measurement of optical path length difference captured by the detector 36 as shown in FIG. 3B. FIG. 4 shows a calculated modulation frequency as a frequency spike 86 within the depicted range of measurement as may be graphically output from the processor 40.

Within the processor 40, the calculated modulation frequency can also be converted into a height on the surface of the test object 18. For gathering data over a range of points on the test object 18 within a common coordinate system, relative motions between the probe 20 and the test object 18 are monitored for tracing a position of the focus 64 of the probe 20 in space. During setup, the optical path length difference between the object and reference beams 56, 58 considered at the ideal focus position is set at a given modulation frequency. During measurement, departures from the given modulation frequency interpreted as surface height variations can be added to or subtracted from the measured relative position of the probe focus 64 to provide a finer measure of the position of a measured point on the test object 18 within the depth of focus of the objective lens 62.

Since departures from the given modulation frequency are also measures of departures from the ideal focus position, the departures from the given modulation frequency can also be used to maintain the focus within a usable range. In other words, the relative position of the probe 20 can be corrected by displacing the probe 20 along the Z axis to position the ideal focal point closer to the surface of the test object 18 and at a modulation frequency closer to the given modulation frequency. The focus corrections, in turn, maintain the probe within both the intended Nyquist interval of measurement and the focal depth of the objective lens 62.

The accuracy with which the modulation frequency can be determined is in part based on the contrast with which the interference phase modulation is expressed. Since intensity is related to the square of the amplitudes of the waveforms, the highest contrast of the interference phase modulations takes place when the relative intensities of the object and reference beam 56, 58 portions of the measurement beam 80 are equal. The intensity of the returning object beam 56 component of the measurement beam 80 depends upon the reflectivity of the test object 18 at the point of measurement, which can vary considerably between test objects or between different parts of the same test object.

To more closely balance the intensities of the reflected object beam 56 and the reflected reference beam 58, various embodiments provide for adjustably excluding a portion of the reference beam 58 over a progression of different size portions from being focused within the acceptance cone of the single mode fiber 44. Different size portions of the reference beam 58 can be blocked or otherwise excluded from reaching the acceptance cone of the single mode fiber 44 to adjust the intensity of the reference beam 58 in accordance with a nominal reflectivity from the test object 18.

For example, as shown in FIG. 2, the reference reflector 76 can be connected to an adjustable beam manipulator in the form of a linear adjuster 82, such as an adjustment-screw-driven mechanism, for displacing the reference reflector 76 along the optical axis of the objective lens 72 to variably defocus the objective lens 72. As a further part of the manipulator, a second linear adjuster 84, which can be in the form of threaded barrel, displaces the objective lens 62 by a related amount to compensate for the optical path length difference between the object arm 60 and the reference arm 70 associated with the translation of the reference reflector 76. The resulting displacement of the object focus 64 can be accommodated by recalibrating the object focus position with respect to the coordinate positions defined by the other machine axes. Alternatively, the objective lens 72 of the reference arm 70 could be similarly translated together with the reference reflector 76 to compensate for the optical path length difference imparted by the translation of the reference reflector 76. The combined translation of the objective lens 72 and reference reflector 76 obviates the need to recalibrate for changes in the position of the object focus 64. Instead of moving the reference reflector 76, the objective lens 72 could be similarly translated along its optical axis to variably defocus the reference beam 58 on the reference reflector 76 without changing the optical path length of the reference arm 70. For example, the objective lens 72 could be mounted in a threaded barrel as a part of a similar linear adjuster to more closely match the intensity of the returning reference beam 58 to a nominal intensity of the returning object beam 56.

Defocusing the objective lens 72 of the reference arm 70 introduces differential amounts of wavefront curvature into the reflected reference beam 58 which expands a focused volume of the measurement beam beyond the acceptance cone of the single mode fiber 44. Increasing defocus excludes a larger portion of the reflected reference beam 58. The adjustment provides a simple and symmetric way of regulating the intensity of the reflected reference beam 58 for resisting destabilizing effects from disturbances such as thermal shifts. For determining a desired amount of defocus, interference contrast can be measured within the detector 36 by the overall measured intensity variation, and return object beam intensity 56, and adjustments to the amount of defocus can be made to better optimize the measured intensity variation.

Figure 5:
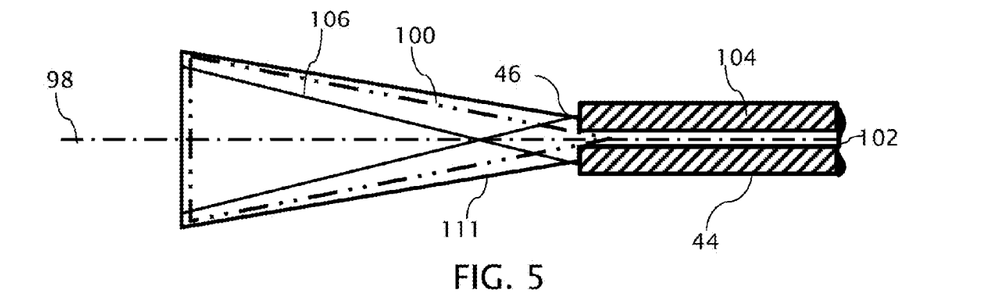
FIG. 5 depicts the effects of a beam manipulator in accordance with the arrangement of FIG. 2 in which a portion of the reference beam is expanded outside an acceptance cone of the single mode fiber.

As shown in FIG. 5, when refocused by the collimator/condenser lens 50, the reference beam 58 portion of the measurement beam 80 contains a larger 111 or smaller 106 range of angles (depending on the direction of defocus) about the optical axis 98 and results in a larger spot size at the end 46 of the single mode fiber 44 such that at least some of the converging elements of the reference beam 58 portion of the measurement beam 80 are oriented outside the acceptance cone of the single mode fiber 44.

For example, as shown in FIG. 5, the volume of light capable of entering the single mode fiber 44 is contained in the acceptance cone 100 shown in the phantom line. A cross section of the single mode fiber 44 shows the core 102 of the single mode fiber 44 exposed with a surrounding cladding 104. Another cone 106 shown in solid line represents the reference beam 58 portion of the measuring beam 80 subject to being defocused by the reference reflector 76 on a path converging before the end 46 of the single mode fiber 44. While the cone 106 still converges in a symmetric fashion about the optical axis 98 of the collimator/condenser lens 50, the cone 106 has angular elements that are distributed outside the acceptance cone 100. As a result, the relative intensity of the reference beam 58 portion of the measuring beam 80 is reduced with respect to the object beam 56 portion of the measuring beam 80.

Figure 6:
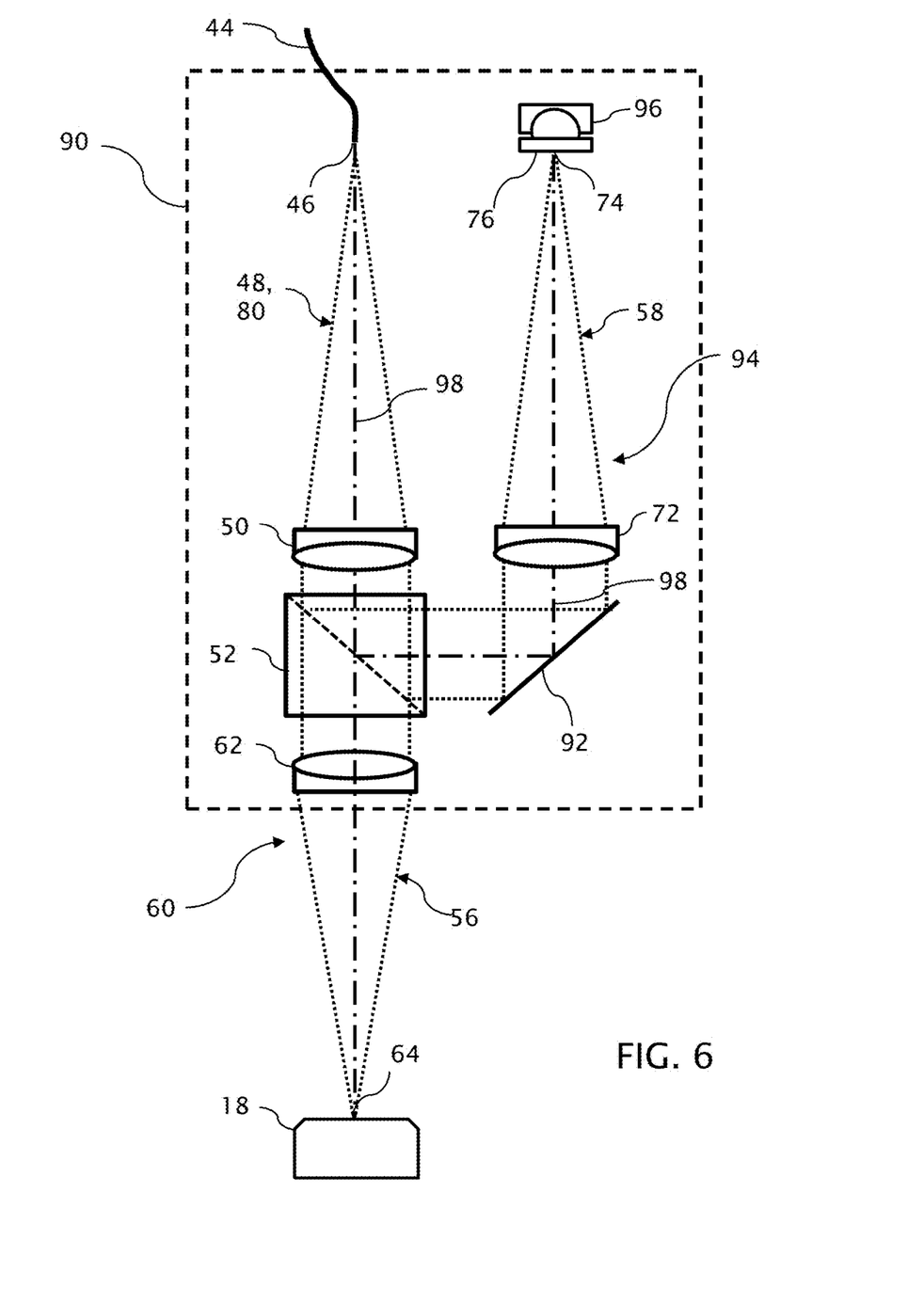
FIG. 6 is an enlarged diagram of alternative probe in which the reference arm is folded and a different type of beam manipulator is featured for more closely balancing intensities of object and reference beams directed to the detector.

FIG. 6 depicts an alternative interferometer probe 90 in a more compact configuration. Most of the components are the same and are referenced by the same numerals. However, a reflector 92, such as a plane mirror, is added to the reference arm 94 to fold the reference arm 94 into a more compact configuration. Although the reference reflector 76 could still be arranged for translation in the more compact configuration, the reference reflector 76 is shown in FIG. 6 mounted on a tilt adjuster 96 that pivots the reference reflector 76 about an axis passing through the reference focus 74. For example, the reference reflector 76 can be arranged in the form of a plane mirror that is tiltable about a fixed axis lying on the reflective surface of the mirror. The mirror can be supported, for example, on a gimbal, a semi-cylindrical bearing, or flexure joints and can be manually tilted, such as by a screw-type tilt adjuster or automatically tilted, such as by piezoelectric actuators.

Tilting the reference reflector 76 about the focal point 74 does not change the nominal optical path length of the reference arm 94 with respect to the optical path length of the object arm 60 or require any recalibration associated with a displacement of the object focus 64 position. The objective lens 72 re-collimates the tilted reflected reference beam 58 in a position that is laterally offset, e.g., no longer centered about the optical axis 98. When refocused by the collimator/condenser lens 50, the reference beam 58 portion of the measurement beam 80 contains an asymmetric distribution of angles about the optical axis 98 such that at least some of the angular elements of the reference beam 58 portion of the measurement beam 80 are removed from the acceptance cone of the single mode fiber 44.

Figure 7:
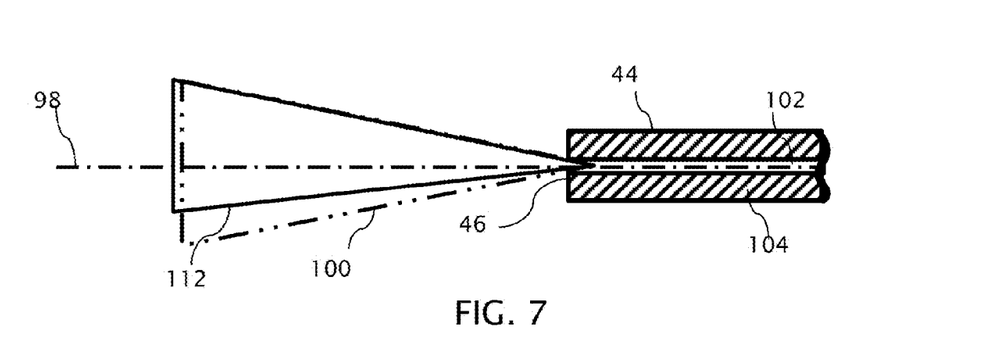
FIG. 7 depicts the effects of a beam manipulator in accordance with the arrangement of FIG. 6 in which a portion of the reference beam is excluded from the acceptance cone of the single mode fiber.

For example, as shown in FIG. 7, a cone 112 shown in solid line (in contrast to the acceptance cone 100, which is shown in phantom line) represents the reference beam 58 portion of the measuring beam 80 subject to being tilted by the reference reflector 76 about the focus 74 on a path converging toward the end 46 of the single mode fiber 44. While the cone 112 still converges toward the core 102 of the single mode fiber 44 along the optical axis 98 of the collimator/condenser lens 50, the cone 112 has angular elements that are asymmetrically distributed around the optical axis 98. Thus, angular portions of 112 are removed that would have been accepted within cone 100 of the single mode fiber 44. As a result, the relative intensity of the reference beam 58 portion of the measuring beam 80 is reduced with respect to the object beam 56 portion of the measuring beam 80.

The object beam 56 portion of the measuring beam 80 can be subject to similar exclusions based on the shape and diffusion characteristics of the test object 18, but the adjustable beam manipulator, such as the linear adjuster 82 or the tilt adjuster 96, can separately adjust the intensity of the reference beam 58 portion of the measurement beam 80 to more closely match the nominal intensity of the object beam 56 portion of the measuring beam 80.

While certain asymmetric or other diverted elements of the reference beam 58 would be physically excluded by the limited acceptance cone 100 of the single mode fiber 44, the referenced exclusion can also take place in advance of the acceptance cone 100 by other limiting apertures of the optical components. For example, elements of the reference beam 58 can be tilted beyond the collection range of the objective lens 72 or vignetted in its collimated form by the collimator/condenser lens 50. In either case, the exclusion is associated with elements of the reference beam 58 that would otherwise arrive beyond the acceptance cone 100 of the single mode fiber 44.

Figure 8:
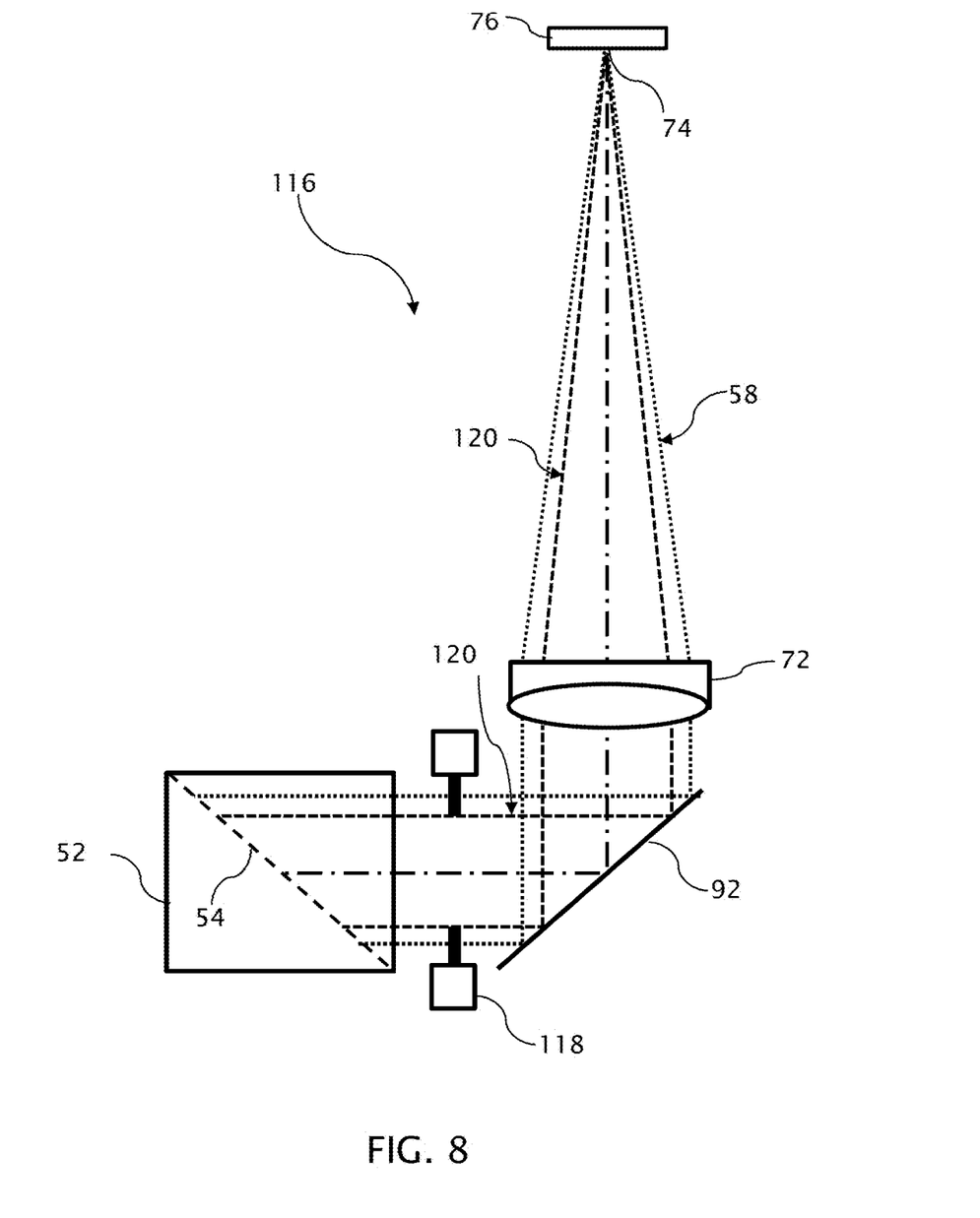
FIG. 8 is an enlarged diagram of an alternative reference arm containing another different type of beam manipulator.

Propagating elements of the reference beam 58 that would otherwise arrive within the acceptance cone 100 of the single mode fiber 44 can also be excluded as shown and described, for example, in the embodiment of FIG. 8. FIG. 8 shows an enlarged reference arm 116 similar to the folded reference arm shown in FIG. 6 in which corresponding optical components share the same reference numerals. However, instead of linearly or angularly adjusting the reference reflector 76 for directing a portion of the volume of the reference beam 58 portion of the measurement beam 80 beyond the volume of the acceptance cone 100 of the single mode fiber 44, the reference arm 116 includes an adjustable aperture stop 118, such as an adjustable iris, for blocking a portion of the reference beam 58 that would otherwise reach the acceptance cone 100 of the single mode fiber 44. Here, a portion of the reference beam 58 is blocked from even reaching the reference reflector 76 and diffraction enlarges the spot size at the entrance 46 of the single mode fiber. The surviving portion 120 of the reference beam 58 is shown in finely dashed line in comparison to the dotted-line depiction of the original reference beam 58. As described, for example, with respect to the tilt adjuster 96, the adjustable aperture stop 118 can be adjusted manually or automatically to intercept different size portions of the reference beam 58 over contiguous or non-contiguous areas. Since the same useful information, i.e., the phase of each wavelength, is contained in wavefronts extending across the reference beam 58, any portion of the reference beam 58, can be blocked for balancing its intensity with the intensity of the object beam 56 portion of the measuring beam 80 and thereby enhancing interference contrast.

Figure 9:
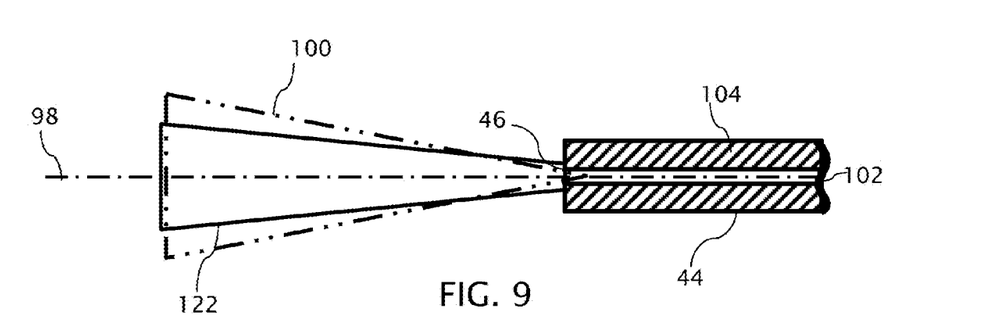
FIG. 9 depicts the effects of a beam manipulator in accordance with the arrangement of FIG. 8 in which a portion of the reference beam is intercepted and diffracted from reaching the acceptance cone of the single mode fiber.

As shown in FIG. 9, instead of filling the acceptance cone 100 of the single mode fiber 44 at the size originally emitted from the single mode fiber 44, the surviving reference beam 120 portion of the measuring beam 80 as cropped by the adjustable aperture stop 118 converges in the form of a cone 122 that underfills the acceptance cone 100 of the single mode fiber 44 and diffracts to a larger spot at 46. Thus, a portion of the original reference beam 58 portion of the measurement beam 80 that would otherwise fit within the acceptance cone 100 of the single mode fiber 44 is lost. The aperture size controlled by the adjustable aperture stop 118 can be adjusted for relatively adjusting the intensity of the reference beam 58 portion of the measurement beam 80 that enters the single mode fiber 44.

Instead of blocking and diffracting light by radially reducing aperture size, any one or more portions of the transverse area of the reference beam 58 can be blocked. For example, the adjustable aperture stop 118 could be constructed in the form of a louver in which one or more vanes are angularly displaced for blocking more or less light. In addition, portions of the reference beam 58 over a progression of different size portions can be excluded from being focused within the acceptance cone 100 of the single mode fiber 44 by various combinations of blocking and diffracting portions of the reference beam 58 that would otherwise reach the acceptance cone 100 or by directing portions of the reference beam 58 beyond the acceptance cone 100. Assuming that the intensity of the reference beam 58 portion of the measuring beam is initially matched with a given intensity of the object beam 56 portion of the reference beam 80, the relative intensity of the reflected object beam 56 can be monitored during the course of measurement to determine whether more or less defocus, tilt or an increased or decreased aperture size is required to rebalance the intensities of the object beam and reference beam 56 and 58 portions of the measurement beam 80.

Figure 10:
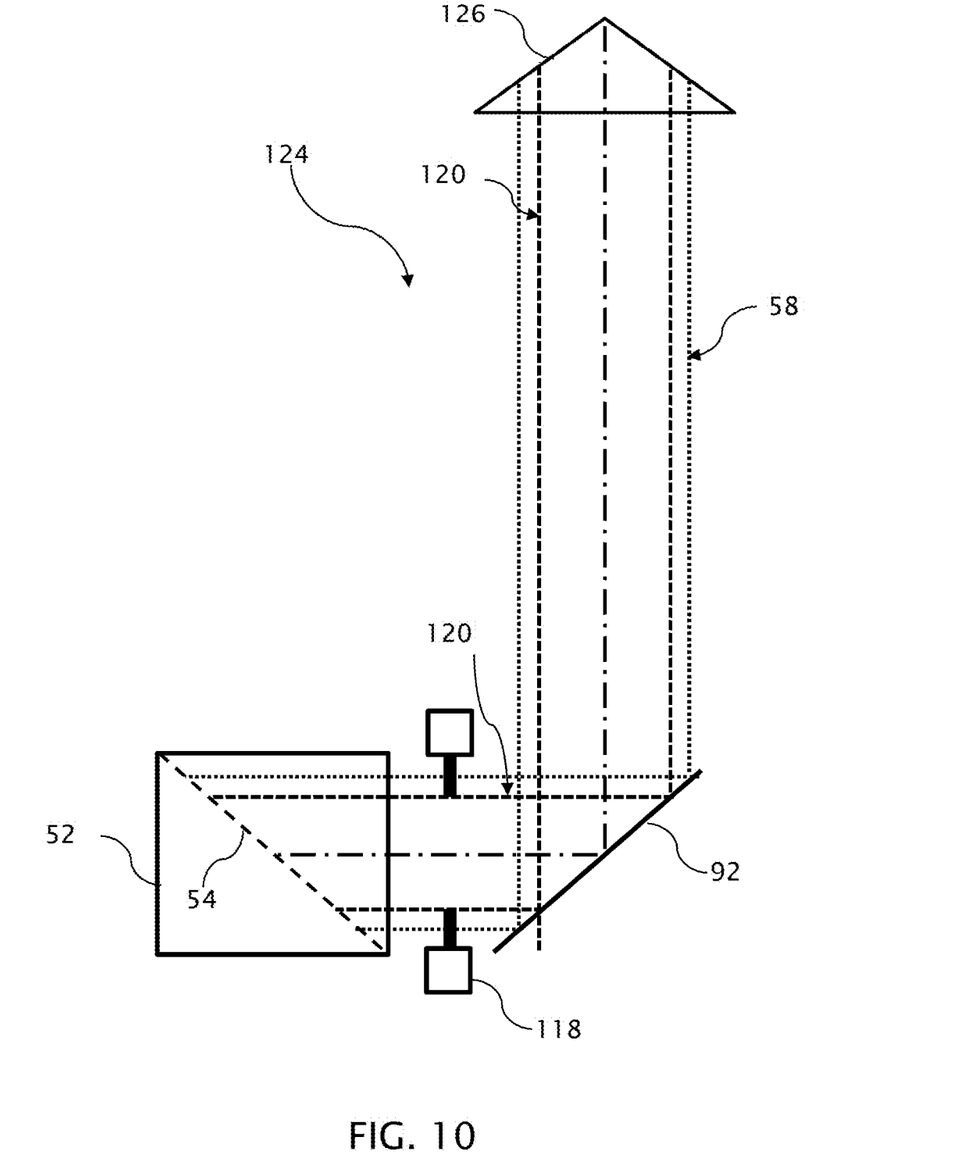
FIG. 10 is an enlarged diagram of an alternative reference arm simplified for use with the beam manipulator of FIG. 8.

FIG. 10 shows an enlarged reference arm 124 similar to the folded reference arm 116 shown in FIG. 8 for use in the interferometer probe 20 in which corresponding optical components share the same reference numerals. In contrast to the reference arm 116 of FIG. 8, the reference arm 124 does not include a reference objective for focusing the reference beam 58. Instead, the reference reflector 126, shown in the form of a retroreflector, such as a corner cube, retroreflects the collimated reference beam 58. However, similar to the embodiment of FIG. 8, the adjustable aperture stop 118 provides for similarly blocking and diffracting a portion of the reference beam 58 that would otherwise reach the acceptance cone 100 of the single mode fiber 44.

The embodiment of FIG. 10 eliminates an objective lens and does not require readjusting the relative optical path lengths of the object and reference arms 60, 124 or recalibrating for a displaced object focus 64. Although shown between the beamsplitter 52 and the reflector 92, the adjustable aperture stop 118 can be positioned anywhere along the reference arm 124 including at or near the reference reflector 126 and can be arranged to block and diffract any one or more portions of the reference beam 58.

The light source 32 for powering the optical profilometer can be a superluminescent diode for generating light over a continuum of wavelengths, which are typically within the infrared spectrum. Preferably, the gain ripple over the working spectrum is low and the bandwidth is matched together with the operating bandwidth of the detector 36. A disadvantage of using light within the infrared spectrum is that the light is invisible, and therefore, does not produce a visible focus spot on the test object 18, which can be useful during setup and use to allow an operator see where the measurement is being made and if the measured point is in focus.

Figure 11:
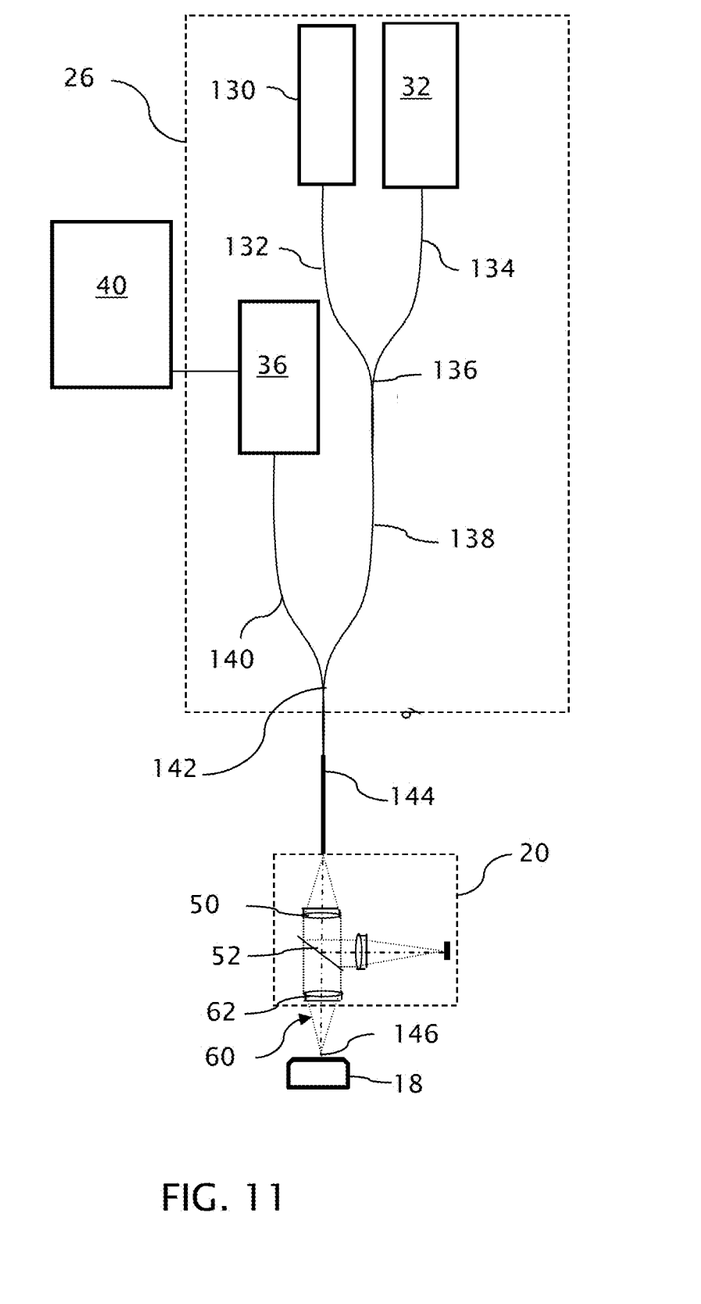
FIG. 11 is a diagram of a similar optical measurement system in which a visible light source is incorporated into the system for illuminating a focus spot on the test object.

FIG. 11 shows a similar optical measurement system in which a visible light source 130, such as a conventional laser diode, is optically coupled with an invisible light source of the measurement system, which invisible light source still designated with the reference numeral 32 for better comparison with other embodiments. Light output from the visible light source 130 as conveyed by a single mode fiber 132 is combined with light output from the invisible light source 32 as conveyed by a single mode fiber 134 at a fiber coupler 136 and is further propagated together along the single mode fiber 138. The fiber coupler 136 can be arranged to compensate for power differences between the two sources, particularly for preserving more of the invisible light intended for measurement and for conveying only the amount of visible light needed to produce the desired visible focus spot. For example, the fiber coupler 136 may be arranged as a 90%/10% coupler. Thereafter, the combined visible and invisible light conveyed along the single mode fiber 138 through a fiber coupling 142 to a single mode fiber 144, which corresponds to the single mode fiber 44 for conveying light to and from the interferometer probe 20. Depending on the fiber which is chosen to be single mode for the interferometer's wavelengths, it may not quite be single mode in the visible. This is not an issue as long as the fiber is single mode for the interferometer's wavelengths. As such, the fiber coupler 142 also couples the single mode fiber 144 to the single mode fiber 140 for conveying light from the interferometer probe 20 to the detector 36.

Within the interferometer probe 20, the visible light follows a path of transmission resulting in the creation of a visible focus spot 146 on the test object 18. That is, the visible light from the visible light source 20 is transmitted along the single mode fiber 144 through the collimating/condenser lens 50 to the beamsplitter 52 and is directed from the beamsplitter 52 along the object arm 60 through the objective lens 62 to form the visible focus spot 146.

While the interferometer probe 20 is preferably connected to both its light sources, e.g. the visible and invisible light sources 130 and 32, and the detector 36 through the single mode fiber 144 for simplifying the connection, the light sources 130, 32 and the detector 36 can be connected to the interferometer probe 20 along separate optical paths. That is, light, such as in the form of the source beam 48, can be delivered to the interferometer probe 20 along one optical path, and light, such as in the form of the measurement beam 80, can be conveyed along a different optical path. The paths can be separated in the interferometer probe 20 such as by exploiting a fourth side of the beamsplitter 52. Thus, one single mode fiber can be used to convey light to the interferometer probe 20 and another single mode fiber can be used to convey light from the interferometer probe 20, but this is not the most robust configuration, which uses one single mode fiber.

Instead of generating an instantaneous bandwidth, the light source 32 can establish a similar bandwidth by generating a succession of different wavelengths over the intended bandwidth. With a single interference phase generated by each wavelength for a given measured point on the test object 18, the detector 36 can be simplified, such as in the form of a simple photodetector.

Those of skill in the art will appreciate that the referenced acceptance cones and converging beam cones are idealized forms and the actual dimensions of the single mode fiber end and the wave nature of the light itself render the cones as approximations of the overall light interactions discussed. In addition, those of skill in the art will appreciate that alternatives, variations, modifications, additions, and different combinations of the elements disclosed in the example embodiments may be made in accordance with the overall teaching of the invention and which are intended to be encompassed by the following claims.

The invention claimed is:

1. A method of enhancing interference contrast in an optical measurement system having an interferometer probe connected to both a light source and a detector by single mode fiber transmissions, comprising steps of:
   directing a collimated source beam having an instantaneous or sequentially established bandwidth spanning a range of wavelengths to a beamsplitter within the interferometer probe;
   dividing the collimated source beam at the beamsplitter into (a) an object beam that is directed along an object arm through an object objective within the interferometer probe to an object focus proximate a test object and (b) a reference beam that is directed along a reference arm to a reference reflector within the interferometer probe;
   angularly redistributing the reference beam along the reference arm;
   combining (a) the object beam reflected from the test object with (b) the angularly redistributed reference beam reflected from the reference reflector at the beamsplitter into a measurement beam; and
   focusing the measurement beam toward an end of a single mode fiber having an acceptance cone that limits angular distributions of the measurement beam that are accepted for further propagation along the single mode fiber toward the detector;
   wherein the step of angularly redistributing the reference beam includes adjusting the angular redistributions of the reference beam to limit the reference beam portion of the focused measurement beam that is accepted through the acceptance cone of the single mode for further propagation toward the detector.

2. The method of claim 1 including a step of comparing respective intensities of the reflected object beam and the reflected reference beam within the measurement beam and limiting the reference beam portion of the measuring beam that is accepted through the acceptance cone of the single mode fiber to more closely balance the intensities of the reflected object beam portion and the reference beam portion of the measurement beam propagating along the single mode fiber.

3. The method of claim 2 in which the excluded portion includes noncontiguous portions of the reference beam.

4. The method of claim 2 in which the step of comparing includes measuring contrast among phase modulations of different wavelengths in the detector.

5. The method of claim 1 in which the step of dividing includes directing the reference beam along the reference arm through a reference objective within the interferometer probe to a reference focus proximate the reference reflector.

6. The method of claim 5 in which the step of angularly redistributing the reference beam includes defocusing the reference beam on the reference reflector.

7. The method of claim 6 in which the reference beam is defocused by translating the reference reflector with respect to the reference objective along a common optical axis together with an optical path length adjustment to maintain a relative optical path length between the reference arm and the object arm.

8. The method of claim 7 in which the optical path length adjustment is effected by relatively translating the object objective with respect to the beamsplitter.

9. The method of claim 5 in which the step of angularly redistributing the reference beam includes pivoting the reference reflector about an axis passing through the reference focus.

10. The method of claim 1 including a step of transmitting the source beam from a light source along the single mode fiber to a collimating lens for directing the collimated source beam to the beamsplitter within the interferometer probe.

11. The method of claim 10 in which the light source is a first light source for emitting invisible light and further comprising steps of transmitting visible light from a second light source along the single mode fiber through the collimating lens to the beamsplitter and directing the visible light from the beamsplitter along the object arm through the object objective to a focus spot visible on the test object.

12. A method of enhancing interference contrast in an optical measurement system having an interferometer probe connected to both a light source and a detector by a single mode fiber transmissions, comprising steps of:
   directing a collimated source beam having an instantaneous or sequentially established bandwidth spanning a range of wavelengths to a beamsplitter within the interferometer probe;
   dividing the source beam at the beamsplitter into (a) an object beam that is directed along an object arm through an object objective within the interferometer probe to an object focus proximate a test object and (b) a reference beam that is directed along a reference arm to a reference reflector within the interferometer probe;
   combining (a) the object beam reflected from the test object with (b) the reference beam reflected from the reference reflector at the beamsplitter into a measurement beam;
   focusing the measurement beam into a single mode fiber within an acceptance cone of the single mode fiber;
   transmitting the measurement beam along the single mode fiber toward the detector; and
   adjustably excluding a portion of the reference beam over a progression of different size portions from being focused within the acceptance cone of the single mode fiber to more closely balance the intensities of the reflected object beam and the reflected reference beam within the measurement beam transmitted toward the detector;
   wherein the step of dividing includes directing the reference beam along the reference arm through a reference objective within the interferometer probe to a reference focus proximate the reference reflector,
   wherein the step of excluding includes angularly redistributing portions of the reference beam so that the excluded portion of the reference beam is directed on a path outside the acceptance cone of the single mode fiber, and
   wherein the reference beam is angularly redistributed by pivoting the reference reflector about an axis passing through the reference focus.

13. The method of claim 12 in which the step of dividing includes directing the reference beam along the reference arm through a reference objective within the interferometer probe to a reference focus proximate the reference reflector.

14. A probe for an optical measurement system comprising:
   a probe body arranged to be adjustably mounted in a measuring machine for optically measuring a test object;
   at least one single mode fiber optically coupled within the probe body for transmitting a source beam having an instantaneous or sequentially established bandwidth spanning a range of wavelengths to the probe body and for transmitting a measurement beam from the probe body toward a detector;
   at least one collimator/coupler, a beamsplitter, an object objective, and a reference reflector mounted within the probe body;
   the at least one collimator/coupler being arranged for collimating the source beam emitted from the at least one single mode fiber;
   the beamsplitter being arranged for dividing the collimated source beam into both an object beam that is directed along an object arm through the object objective to an object focus proximate the test object and a reference beam that is directed along a reference arm to the reference reflector;
   an adjustable beam manipulator for angularly redistributing the reference beam along the reference arm
   the beamsplitter also being arranged for combining the object beam reflected from the test object with the angularly redistributed reference beam reflected from the reference reflector into the measurement beam;
   the at least one collimator/coupler being arranged for focusing the measurement beam toward the at least one single mode fiber having an acceptance cone of the at least one single mode fiber that limits angular distributions of the measurement beam that are accepted for further propagation along the single mode fiber toward a detector; and
   the adjustable beam manipulator being arranged for adjusting the angular redistributions of the reference beam to limit the reference beam portion of the focused measurement beam that is accepted through the acceptance cone of the single mode fiber for further propagation toward the detector.

15. The probe of claim 14 in which a reference objective is also mounted in the probe body and the reference beam is directed along the reference arm through the reference objective to a reference focus proximate the reference reflector.

16. The probe of claim 15 in which the adjustable beam manipulator provides for variously defocusing the reference beam on the reference reflector.

17. The probe of claim 16 in which the adjustable beam manipulator includes a first linear adjuster for translating the reference reflector with respect to the reference objective along a common optical axis and a second linear adjuster for relatively adjusting relative optical path length between the reference arm and the object arm to compensate for a change in optical path length associated with the translation of the reference reflector.

18. The probe of claim 15 in which the adjustable beam manipulator includes a tilt adjuster for pivoting the reference reflector about an axis passing through the reference focus.

19. The probe of claim 14 in which the at least one single mode fiber that is optically coupled within the probe body is a single fiber that provides for both transmitting the source beam to the probe body and transmitting the measurement beam from the probe body.

20. The probe of claim 14 in which each of the excluded portions includes noncontiguous portions of the reference beam.

21. A probe for an optical measurement system comprising:
- a probe body arranged to be adjustably mounted in a measuring machine for optically measuring a test object;
- at least one single mode fiber optically coupled within the probe body for transmitting a source beam having an instantaneous or sequentially established bandwidth spanning a range of wavelengths to the probe body and for transmitting a measurement beam from the probe body toward a detector;
- at least one collimator/coupler, a beamsplitter, an object objective, and a reference reflector mounted within the probe body;
- the at least one collimator/coupler being arranged for (a) collimating the source beam emitted from the at least one single mode fiber and (b) focusing the measurement beam into the at least one single mode fiber within an acceptance cone of the at least one single mode fiber;
- the beamsplitter being arranged for (a) dividing the collimated source beam into both an object beam that is directed along an object arm through the object objective to an object focus proximate the test object and a reference beam that is directed along a reference arm to the reference reflector and (b) combining the object beam reflected from the test object with the reference beam reflected from the reference reflector into the measurement beam; and
- an adjustable beam manipulator for spatially excluding portions of the reference beam over a progression of different size portions from being focused within the acceptance cone of the at least one single mode fiber to more closely balance the intensities of the reflected object beam and the reflected reference beam within the measurement beam,
- wherein a reference objective is mounted in the probe body and the reference beam is directed along the reference arm through the reference objective to a reference focus proximate the reference reflector,
- wherein the beam manipulator provides for angularly redistributing portions the reference beam so that certain angular portions of the reference beam are excluded from the acceptance cone of the single mode fiber, and
- wherein the beam manipulator includes a tilt adjuster for pivoting the reference reflector about an axis passing through the reference focus.

22. The probe of claim 21 in which the reference beam is directed along the reference arm through a reference objective to a reference focus proximate the reference reflector.

* * * * *